United States Patent
Craske et al.

(10) Patent No.: US 8,966,228 B2
(45) Date of Patent: Feb. 24, 2015

(54) INSTRUCTION FETCHING FOLLOWING CHANGES IN PROGRAM FLOW

(75) Inventors: Simon John Craske, Cambridge (GB); Chiloda Ashan Senerath Pathirane, Haverhill (GB)

(73) Assignee: ARM Limited, Cambridge (GB)

( * ) Notice: Subject to any disclaimer, the term of this patent is extended or adjusted under 35 U.S.C. 154(b) by 1312 days.

(21) Appl. No.: 12/382,690

(22) Filed: Mar. 20, 2009

(65) Prior Publication Data

US 2010/0241832 A1 Sep. 23, 2010

(51) Int. Cl.
- G06F 15/00 (2006.01)
- G06F 9/30 (2006.01)
- G06F 9/40 (2006.01)
- G06F 9/32 (2006.01)

(52) U.S. Cl.
CPC ............... *G06F 9/321* (2013.01); *G06F 9/324* (2013.01)
USPC ........................................................ 712/205

(58) Field of Classification Search
USPC ............................... 712/205, E9.073, E90.73
See application file for complete search history.

(56) References Cited

U.S. PATENT DOCUMENTS

| | | | | |
|---|---|---|---|---|
| 4,984,151 A | * | 1/1991 | Dujari | 712/241 |
| 5,590,358 A | * | 12/1996 | Mizrahi-Shalom et al. | 712/204 |
| 5,649,225 A | * | 7/1997 | White et al. | 712/23 |
| 5,706,459 A | * | 1/1998 | Atsushi | 712/200 |
| 5,724,563 A | * | 3/1998 | Hasegawa | 712/233 |
| 5,727,194 A | * | 3/1998 | Shridhar et al. | 712/241 |
| 5,734,880 A | * | 3/1998 | Guttag et al. | 712/221 |
| 6,026,484 A | * | 2/2000 | Golston | 712/226 |
| 6,085,315 A | * | 7/2000 | Fleck et al. | 712/241 |
| 6,253,307 B1 | * | 6/2001 | Boutaud et al. | 712/209 |
| 2004/0193858 A1 | * | 9/2004 | Ahmad et al. | 712/241 |
| 2006/0095751 A1 | * | 5/2006 | Bybell et al. | 712/241 |
| 2007/0101103 A1 | * | 5/2007 | Nguyen et al. | 712/215 |
| 2009/0106541 A1 | * | 4/2009 | Mizuno et al. | 712/239 |

* cited by examiner

*Primary Examiner* — George Giroux
(74) *Attorney, Agent, or Firm* — Nixon & Vanderhye P.C.

(57) ABSTRACT

This application is concerned with a device and method for fetching instructions from a data store for processing by a data processor. The device comprises: a register for storing an address of an instruction to be processed by said data processor; a fetch unit responsive to an address input to said fetch unit to fetch an instruction stored at said address; an adder for adding a predetermined amount to said address stored in said register prior to sending said address to said fetch unit, said predetermined amount determining a position in a program flow said fetched instruction has with respect to said instruction addressed in said register; said adder being responsive to detection of a change in program flow to reset said predetermined amount to an initial value, and to increase said predetermined amount for subsequent fetches by an amount equal to the separation between addresses such that consecutive addresses are fetched up to a maximum predetermined amount.

18 Claims, 4 Drawing Sheets

INSTRUCTION FETCHING FOLLOWING CHANGES IN PROGRAM FLOW

TECHNICAL FIELD

The technical field relates to fetching instructions from a data store for processing by a processor.

BACKGROUND

Program counters are used in data processing apparatus to indicate the address where an instruction to be executed is stored. In a processor generally an instruction is fetched, decoded and then executed. If the processor is pipelined, then at any one time there will be an instruction being fetched, another one being decoded and a further one being executed. Thus, at any one time there are generally multiple instructions at different places within the pipeline and multiple program counters can be used to identify the instructions in each part of the pipeline.

In some processors where it is desirable to reduce gate count, only one program counter is used to indicate an address of one of the instructions, say the instruction to be fetched, and the addresses of the other instructions within the processing path can be derived from this address and known delays, where consecutive instructions are being processed.

If there is a change in program flow, then one can no longer predict the address of an instruction currently being executed from an address of an instruction being fetched.

Following a change in program, flow due for example to an interrupt, the instruction address of the instruction currently being executed needs to be stored so that the program can return to the point at which it was interrupted. Conventionally software has been used to calculate from a single program counter and known delays what instruction is currently being executed. This is expensive in time and resources.

It would be desirable to be able to use a single program counter and to be able to determine both the address of an instruction at a certain point in the processing path and the address of an instruction to be fetched following a change in program flow, in a way that is power, time and area efficient.

SUMMARY

A first aspect provides a device for fetching instructions from a data store for processing by a data processor, said device comprising: a register for storing an address of an instruction to be processed by said data processor; a fetch unit responsive to an address input to said fetch unit to fetch an instruction stored at said address; an adder for adding a predetermined amount to said address stored in said register prior to sending said address to said fetch unit, said predetermined amount determining a position in a program flow said fetched instruction has with respect to said instruction addressed in said register; said adder being responsive to detection of a change in program flow to reset said predetermined amount to an initial value, and to increase said predetermined amount for subsequent fetches by a preset value such that consecutive instructions are fetched up to a maximum predetermined amount.

When a single program counter is used, then this will indicate an instruction at a certain point in a processing path. Adding a certain amount to this address provides an address of a later instruction in the program flow, the amount added determining how many instructions later the addressed instruction is.

If there is a change in program flow then rather than incrementing an instruction address by a certain amount to determine the next instruction address, a new instruction address will need to be provided and the address of the instruction currently being executed will also need to be stored so that the program can later return to this point.

If there is a single program counter that points at an instruction at a certain point in the processing path, then determining both an instruction address to be fetched and an instruction address of an instruction currently executing, which is needed if there is a change in program flow, is not straightforward. This problem is solved, preferably in hardware, by the use of an adder to add a predetermined amount to the instruction address in the register prior to fetching an instruction. The value of the predetermined amount determines a position in the program flow of the instruction of the resultant address with respect to the instruction corresponding to the stored address. In this way by varying the predetermined amount that is added to the stored address prior to sending it to the fetch unit, the adder itself can control the fetching of consecutive instructions from the instruction stream. When a change in program flow occurs then the new address provided needs to be fetched. An adder is used to change the predetermined amount added to the instruction address in response to detection of a change in program flow, so that the required address can be accessed. The predetermined amount can then be increased so a next instruction is fetched and so on. Once the system is stable again with consecutive instructions filling the pipeline, one can revert to the normal system for updating for consecutive instructions. Thus, the use of an adder that can add different predetermined amounts to the instruction address stored, provides a low area hardware solution to the problem of being able to extract both the address of an instruction at a certain point in the processing path and the address of an instruction to be fetched following a change in program flow. As will be appreciated by the skilled person changes in program flow can be caused by branch instructions, exceptions and function calls/returns.

It should be noted that the preset value that the adder increments the address of the instruction by to retrieve consecutive instructions is generally an amount equal to a separation between addresses of instructions, where the fetch unit fetches a single instruction. If the fetch unit fetches multiple instructions then clearly this value will be the separation between the multiple instructions.

In some embodiments, said adder is adapted to increase said predetermined amount in response to a signal indicating a bus for retrieving said instructions from said data store is ready.

In order for the fetch device to fetch consecutive instructions after a change in program flow the predetermined amount added to the instruction address is increased by an amount equal to the separation between instruction addresses. In order for this to be synchronised with the fetch unit, the adder is responsive to a signal indicating that the bus which is used to retrieve the instructions from the data store is ready, to increase the predetermined amount. In this way, the address sent to the fetch unit is incremented to the next instruction address in response to a signal indicating that the fetch unit is ready to fetch the next address. This is a convenient way of indicating to the adder that the next address is required, however it will be clear to the skilled person that other implementations that allow consecutive addresses to be fetched by the fetch unit are possible.

In some embodiments, said adder comprises a saturating counter for increasing said predetermined amount in response to said signal.

Although the predetermined amount can be increased in a number of ways, a convenient way is to use a saturating counter which in response to a signal counts by the required amount up to a maximum. It stops incrementing when it reaches the maximum amount and continuously outputs this amount.

In some embodiments, when said adder adds said maximum predetermined amount to said instruction address, said address stored in said register is an address of an instruction currently being executed by said processor.

Although the address of the instruction stored in the register can be an instruction located anywhere in the processing path, in preferred embodiments it is an address of the instruction currently being executed by the processor when the maximum predetermined amount has been added to the instruction address. When the maximum predetermined amount has been added to the instruction address, this is the stable state of the system. Thus, in this embodiment, in its stable state the address of the instruction stored in the register is the address currently being executed. When a change in program flow occurs, it is this instruction address that is required as the return address and thus, having it stored in the register means that it is easy to extract following a change in program flow.

In some embodiments, said initial value is zero such that said instruction address output by said adder is said instruction address stored in said register.

If the initial value of the predetermined amount is zero then following a change in program flow the new instruction address indicated by the change in program flow can be stored in the register and output with zero added and thus, this instruction can be fetched. Furthermore, the previous address stored there can also be output if the initial value is set to zero before this is overwritten. This can be particularly convenient in embodiments where this is the address of the instruction currently being executed.

In some embodiments, said device comprises an incrementing device for incrementing said address stored in said register to an address of a next instruction in said program flow, said incrementing device being responsive to detection of an instruction completing execution in said data processor to increment said address stored in said register.

Embodiments increment the value of an instruction address stored in the register in response to a signal indicating completion of execution of an instruction. As the value stored in the register is used by the fetch unit, then incrementing it in this way causes the next instruction to be fetched. Thus, in a conventional way as an instruction is executed a next instruction is fetched. If there is a change in program flow then the instructions currently being processed will be stalled within the processing path until the instruction following the change in program flow arrives, whereupon processing will resume. Thus, no signal will be received from the processor indicating that an instruction has executed until the instruction following the change in flow has been executed. Thus, incrementing instruction addresses to fetch next instructions will only be controlled by the signal indicating execution of an instruction when the processing path is full.

In some embodiments, said predetermined amount has a number of different possible values, said number being equal to the cycles taken to fetch, decode and perform a cycle of execution of said instruction.

As noted above prior to the processing path being full, there is no signal to increment the address stored in the register. During this phase of processing, the adder adding predetermined amounts to the instruction address determines which addresses are fetched. Thus, in order for consecutive instructions to be fetched and to fill the processing path prior to an instruction being executed and sending a signal to increment the instruction address in the register in the usual way, it is advantageous if the number of different values that the adder can add is equal to the number of cycles of the processing path. In this way, incrementing the predetermined amount by the adder controls the fetching of consecutive instructions until the processing path or pipeline is full. At this point, the added predetermined amount is no longer incremented and it is the value in the register that is incremented in the usual way in response to instructions being executed.

In some embodiments, said device is responsive to detection of an exception to set said predetermined amount to said initial value and to output said instruction address stored in said register incremented by said initial value to a data store.

Following a change in program flow, it is not only desirable that the new instruction for the change is fetched; it is also desirable that a record of a previous instruction that was executed prior to the change in program flow is kept so that following this change in program flow the old program flow can be resumed from the point it had reached. Thus, once the predetermined amount has been set to the initial value, the instruction address stored in the register can be incremented by this amount and output. If the initial value is chosen appropriately then this instruction address will be the instruction address required to enable the system to resume execution at the point it had reached.

In some embodiments, said device is responsive to a signal indicating resumption of said program, to retrieve said instruction address from said data store and to store said instruction address in said register and to set said predetermined amount to said initial value.

Following a signal indicating resumption of said program at a point said program had reached prior to the change in program flow then the device can retrieve the instruction address that has been stored and set the predetermined amount to the initial value again, insert the retrieved instruction address in the register and one can once again start retrieving instruction addresses from this address plus the initial value.

The predetermined amount can be derived by the adder in a number of ways, and in some embodiments the adder comprises a data store for storing this value. In other embodiments the value may be derived using a saturating counter that increments and resets in response to particular signals.

In some embodiments, following said predetermined amount reaching said maximum value, said adder continues to add said maximum value to said instruction address received from said register until receipt of a signal indicating a change in program flow.

Once the predetermined amount has reached the maximum value, this generally indicates that the processing path is full and a stable state has been reached again. At this point, the instruction address stored in the register can be incremented in the usual way and the maximum predetermined amount is added to this address such that the address stored in the register from this point on indicates an address at a same point in the processing pipeline and consecutive addresses are fetched.

A second aspect provides a pipeline data processor for processing instructions, comprising: a data store for storing instructions; a device according to a first aspect for fetching said instructions from said data store; a decoder for decoding said instructions received from said fetching device; an execute unit for executing said decoded instructions.

A third aspect provides a method of fetching instructions from a data store for processing by a data processor, comprising the steps of: (i) adding a predetermined amount to an address stored in a register, said predetermined amount determining a position in a program flow said amended addressed instruction has with respect to said instruction addressed in said register and outputting said amended address; (ii) fetching an instruction from said output address; and in response to detection of a change in program flow: (iii) resetting said predetermined amount to an initial value, and performing steps (i) and (ii) for said initial value; (iv) increasing said predetermined amount by an amount equal to the separation between addresses of instructions and performing steps (i) and (ii) for said increased amount such that a subsequent instruction is fetched and repeating step (iv) up to a maximum predetermined amount.

A fourth aspect provides a device for fetching instructions from a data store for processing by a data processor, said device comprising: a register for storing an address of an instruction to be executed by said data processor; fetch device responsive to an address input to said fetch unit to fetch an instruction stored at said address; an adder for adding a predetermined amount to said address stored in said register prior to sending said address to said fetch unit, said predetermined amount determining a position in a program flow said fetched instruction has with respect to said instruction addressed in said register and having a value such that when an instruction is being executed said instruction address stored in said register is an address of said instruction being executed; said adder being responsive to detection of a change in program flow to change said predetermined amount to zero such that said instruction address output by said adder is said instruction address stored in said register.

This aspect of the present invention recognises that the predetermined amount added to an instruction address stored in a register prior to fetching it determines the position in the program flow that the fetched instruction has with respect to the instruction addressed in the register. It also recognises that by selecting an appropriate value the instruction address in the register will be that currently being executed. This can be advantageous as when a change in instruction flow is detected it is the address of the instruction that is currently being executed that is required to be known in order to allow resumption of execution of the program at the point the change in flow occurred. Thus, by adding this amount to the instruction address prior to fetching it, when a change of program flow is detected, this value can simply be retrieved from the register ready to allow resumption of the program flow at the point it changed. In this way the required address can be directly output without complicated manipulations being required to determine which instruction was actually being executed at this point. Furthermore, the instruction address of the instruction following the change in flow can be simply loaded into the register and the adder can be set to add zero to this address, so that this address can be directly output and the required instruction fetched.

The above, and other objects, features and advantages will be apparent from the following detailed description of illustrative embodiments which is to be read in connection with the accompanying drawings.

DESCRIPTION OF NON-LIMITING EXAMPLE EMBODIMENTS

Figure 1:
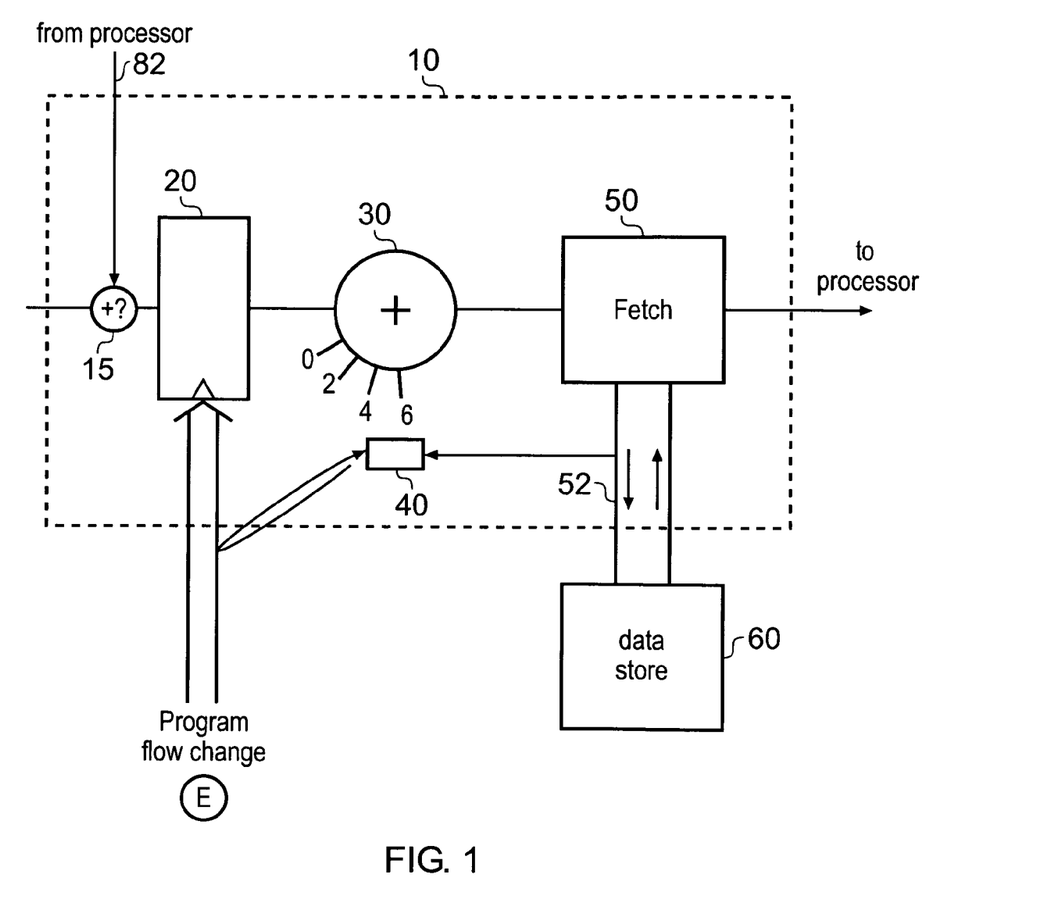
FIG. 1 shows a device for fetching instructions from a data store to be executed.

FIG. 1 shows a device 10 for fetching instructions from a data store 60. Register 20 acts as the program counter to store an address of an instruction.

Adder 30 receives the address stored in register 20, adds a predetermined amount to it, the predetermined amount being stored in storage element 40, and sends it to fetch unit 50. Fetch unit 50 accesses data store 60 via bus 52 and retrieves an instruction stored at the address indicated. This instruction is then sent to a processor for decoding and execution.

During a program flow where consecutive instructions are being processed, a signal 82 indicating execution of an instruction is complete is sent from the processor to incrementing logic 15. Incrementing logic 15 acts to add two to the instruction address stored in register 20 in response to this signal. In this embodiment, consecutive instructions are stored at every other address in data store 60, thus incrementing the stored address by two results in the addresses of consecutive instructions being stored. This instruction address is output from the register 20 to adder 30 where a predetermined amount, in this case 6 is added to it. The fetch unit 50 therefore fetches an instruction at this resultant address from data store 60 and sends it to be decoded and processed.

Figure 2:
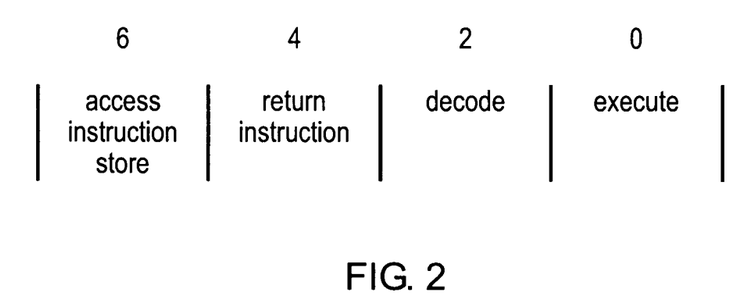
FIG. 2 shows a timing diagram indicating how instructions move through the various stages of the device in FIG. 1.

FIG. 2 shows a timing diagram of the time taken for each cycle. Thus, in this embodiment the fetch in effect takes two cycles; a cycle where the data store is accessed to fetch and a cycle where the accessed data is returned. There is then a cycle for the decoding of the instruction and at least one cycle for the execution. Thus, by adding 6 to the instruction address output from the register prior to it being fetched, the instruction address that is stored in the register is an address of an instruction that was fetched three cycles ago and thus, is the address of the instruction currently being executed. It will be clear to the skilled person that depending on the number of cycles required for execution of an instruction and the way the addressed instructions are stored, appropriate values can be added to the address stored in the register to enable the address currently stored to be that currently executed. An advantage of the address being stored in the register being the address that is currently executed is that if a change in program flow occurs then it is this address that will be required when resuming the program flow at the point where the change occurred.

In this embodiment, in response to detection of a change in program flow such as an exception, a signal is sent to storage element 40 to reset the value stored there. In this embodiment the value stored is reset from 6 to zero. Thus, the instruction address currently stored in register 20 is output. This instruction address can then be stored ready for resumption of processing when the program flow reverts to the point where it changed. The new address of the instruction following the change in program flow is then input to register 20. As the data store has been reset to zero, adder 30 outputs this address to fetch unit 50 which fetches an instruction from this address. Once it has fetched this instruction, a signal is sent from bus 52 indicating that it is ready to fetch the next instruction. This signal is used by logic in the adder 30 to increase the value stored in data store 40. In response to this increase in value the next predetermined amount which in this case is two is added to the address stored in register 20. Thus, the next address is fetched by fetch device 50 from data store 60. Once bus 52 indicates that the fetch instruction from the data store has been sent successfully then a signal is sent to data store 40 which increments it to a 4 and so on up to the maximum amount of 6. Thus, initially following a change in program flow it is the adder and logic associated with it that controls the fetching of consecutive instructions.

Once the adder has reached its maximum amount of 6, then as can be seen from the timing diagram of FIG. 2, at this point the first instruction following the change in program flow is being executed. Thus, while the instruction incremented by zero is being executed, the instruction incremented by 6 is being fetched. At this point, the pipeline is full and the maximum predetermined amount 6 has been added by the adder to the instruction.

The fetching device then reverts to its earlier stable operation wherein in response to a signal that an instruction has executed, the value in register 20 is incremented by 2. This value is then input to adder 30 and 6 is added to it and in this way consecutive instructions are fetched from the data store. Thus, control of the fetching of consecutive instructions reverts from the adder 30 to incremental logic 15.

When there is a signal that there is to be a change in program flow back to the earlier program flow then the value set in 40 is once again reset to zero, the address currently in register 20 is output and the address of the instruction executing when the change in program flow occurred that was stored previously in a data store is input into register 20. As data store 40 has been reset to zero, a zero is added to this value and thus, this instruction is fetched. At this point, as there has been a change in program flow, the operation of the pipeline is stalled and no instructions will complete execution until the new instruction that has been fetched is executed itself. Thus, once again adder 30 controls the fetching of consecutive instructions. Once the adder has reached its maximum amount of 6, then the first instruction will be executing and when it has executed a signal will be sent to incremental logic 5 to increment the address stored in register 20, and thus, the control of the fetching of consecutive instructions will again revert to incremental logic 15.

Figure 3:
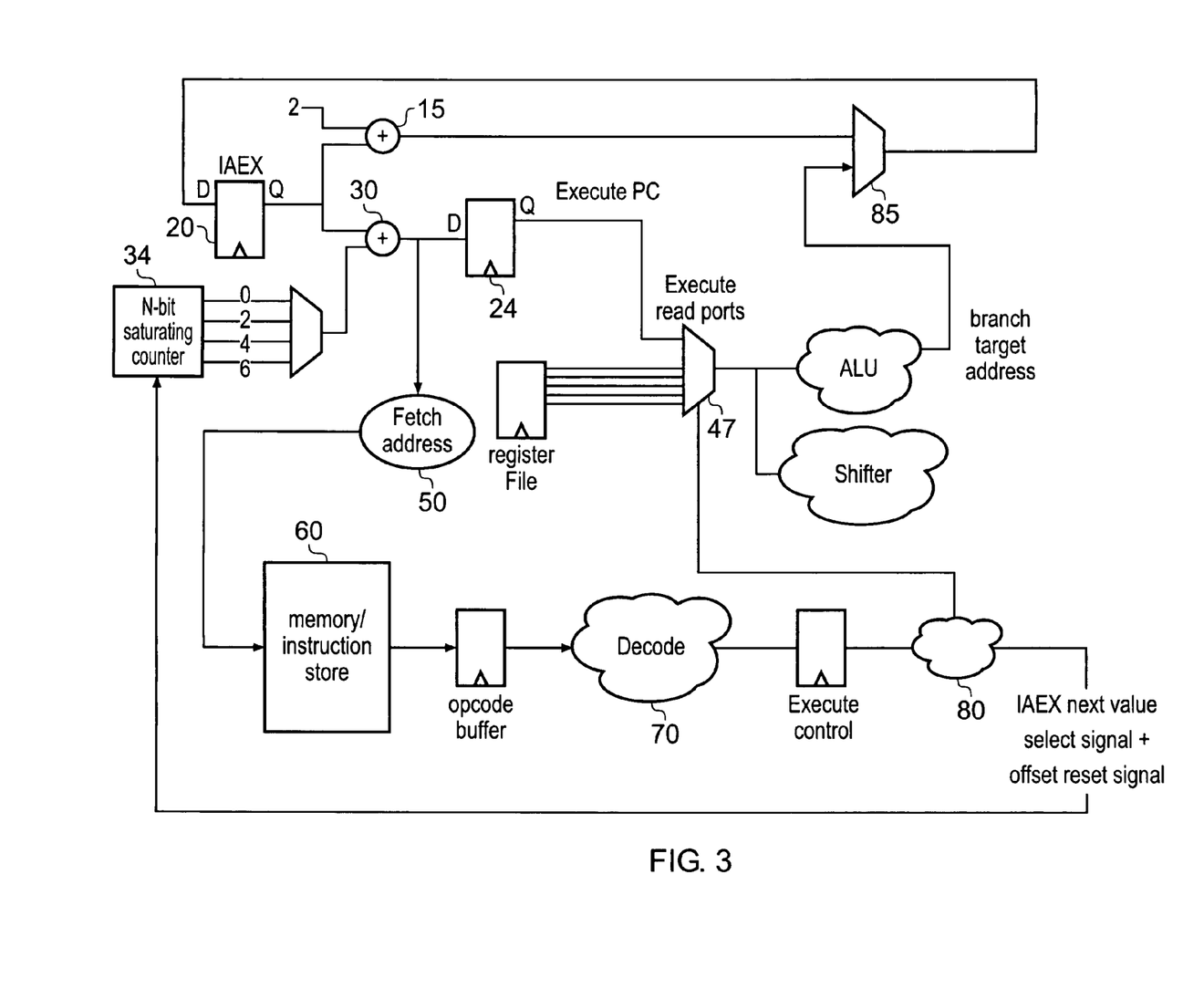
FIG. 3 shows a data processing apparatus according to an embodiment.

FIG. 3 shows a data processing apparatus according to an embodiment of the present invention. This Figure shows program counter 20 which stores a value of the instruction currently being executed. It shows incrementor 15 operable to increment this value by 2, fetch logic 50 for fetching instructions from a memory instruction store 60 and an adder 30 for adding a predetermined amount to the instruction address stored in program counter 20 prior to sending it to the fetch logic 50. Adder 30 includes an N-bit saturating counter 34 which counts between 0, 2, 4 and 6 and outputs this value for adding to the output from the program counter 20. The value output from the adder 30 is input to both fetch logic 50 and to a register data store 24. The address output by adder 30 is fetched by fetch logic 50 from the memory instruction store 60 and the instruction fetched is then sent for decoding by decode logic 70 and then for execution by execution logic 80.

In this embodiment, multiplexer 85 selects between inputting the previous instruction with two added to it or a new target address following a branch. It selects the address incremented by 2 in response to a signal from execution logic that an instruction has completed and it selects the target of the branch in response to a signal from the ALU that the program flow should branch.

If a branch target address is output from the ALU then multiplexer 85 selects this to input to instruction address register 20. Similarly at this point there is a signal sent to N-bit saturating counter 34 indicating that there was a change in program flow and the offset signal should be reset to zero. At this point, zero is added to the value stored in the instruction address register 20 and this is then stored in data store 24 as the return address following the branch. Register 20 is then updated with the branch target address and zero is added to this and thus this address is fetched. When the bus fetching this address is ready it sends a signal to N-bit saturating counter 34 and this is incremented to 2 and thus, the next address is fetched. This continues until the N-bit saturating counter reaches 6 at which point the initial instruction fetched from an address incremented by zero is being executed and the pipeline is full. When this initial instruction has completed execution a signal is sent to multiplexer 85, which then selects this initial signal incremented by 2 by incrementor 15. This is then input to program counter 20. Adder 30 then adds six to this address and in this way the next instruction is fetched.

When the branch has completed it needs to revert to the instruction prior to the change in program flow. Returning from a function (or interrupt), is achieved by loading IAEX from the data store, or for some functions from the register file. Calling a function requires recording IAEX in the register file. Taking an interrupt requires recording IAEX in the data-store, the data store path being in parallel to "shifter" in the diagram. Being Von-Neumann in design, there is an additional complexity that the location within the data-store that IAEX is loaded and stored from is generated by the same piece of wire labelled branch-target-address, with the address coming from the Stack-Pointer (SP) in the register file. Multiplexer 85 then selects this path labelled "branch target address" and the IAEX address is stored in register 20. At the same time a reset signal is sent form execution logic 80 to N-bit saturating counter 34 to reset this to zero. The N-bit saturating counter then increments the value that is added to the instruction address stored in program counter 20 from 0 to 2, 4 and then 6 at which point the pipeline is full and the incrementing of the address fetched then occurs by updating the address stored in register 20 by incrementing it by 2 using incrementor 15 in response to signals output by execution logic 80.

Figure 4:
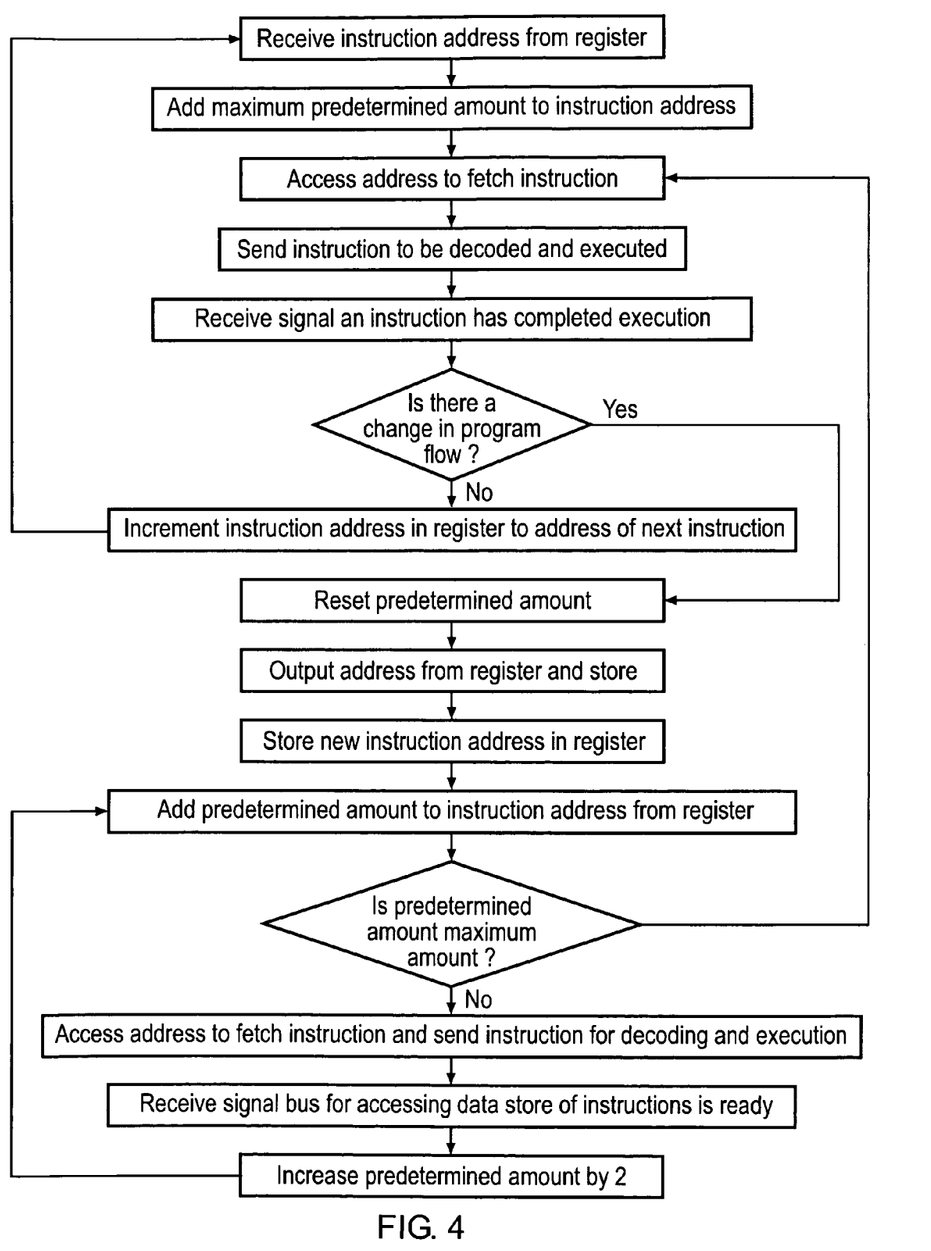
FIG. 4 shows a flow diagram illustrating a method of fetching instructions according to an embodiment.

FIG. 4 shows a flow diagram of a method of fetching instructions according to an embodiment. It should be noted that as is shown in FIG. 2, the technology relates to a pipelined processor and thus, accessing the instructions occurs in parallel with retrieving the instructions, which occurs in parallel with decoding the instructions and execution of the instructions.

The top part of the flow diagram illustrates instruction fetching in a state where the pipeline is full. Here an instruction address is received from the register and the maximum predetermined amount is added to this instruction address, this increased instruction address is then sent to the fetch unit where the address is accessed and the instruction stored there fetched. This instruction is then sent to be decoded and executed. If there is no change in program flow then the instruction address register is incremented in response to detecting execution of an instruction and the next instruction is fetched. It should be noted that the instruction whose execution has completed is not the instruction that has just been fetched but one that was fetched several cycles earlier.

If there is a change in program flow then the method reverts to that described in the lower part of the flow diagram. Initially the predetermined amount is reset. This reset amount is then added to the instruction address stored in the register and this is output and stored.

The new address from the change in program flow is then stored in the register and the reset predetermined amount is added to this address. It is then seen if this predetermined amount is the maximum amount. If it is not then the instruction stored at this address is fetched and sent for decoding and execution. When a signal is received showing that the bus is ready so the fetch unit can fetch a next instruction then the predetermined amount is incremented by 2 and this is added to the address in the register. It is then checked to see if this predetermined amount is the maximum amount and if not the address is accessed the instruction fetched and sent for decoding and execution and the loop is repeated.

If it is determined that the predetermined amount is the maximum amount, then this loop which involves incrementing the predetermined amount via the adder is exited and we return to the loop at the top of the figure where consecutive addresses are accessed by incrementing the address stored in the register rather than the predetermined amount added to it.

As can be appreciated, consecutive instruction in the program flow are addressed in one of two ways: either by incrementing the values stored in the instruction register which is what happens when the pipeline is full, or by incrementing the predetermined amount added by the adder to the stored address which occurs when the pipeline is not full. Thus, by incorporating an adder with these properties into the fetching means of the device, a processor that can deal with changes in program flow automatically using hardware is achieved.

Although illustrative embodiments have been described in detail herein with reference to the accompanying drawings, it is to be understood that the claims are not limited to those embodiments, and that various changes and modifications can be effected therein by one skilled in the art without departing from the scope and spirit of the appended claims.

We claim:

1. A device for fetching instructions from a data store for processing by a data processor, said device comprising:
   (i) a register for storing an address of an instruction to be processed by said data processor;
   (ii) a fetch unit responsive to a fetch address input to said fetch unit to fetch an instruction stored at said fetch address,
   wherein said register is configured to store in a current processing cycle an address of an instruction fetched by the fetch unit in a previous processing cycle;
   (iii) an adder configured to generate said fetch address by adding a predetermined amount to said address stored in said register prior to sending said fetch address to said fetch unit, said predetermined amount determining a position in a program flow said fetched instruction has with respect to said instruction at said address stored in said register;
   (iv) said adder being responsive to detection of a change in program flow to reset said predetermined amount to an initial value, and to increase said predetermined amount for subsequent fetches by a preset value, such that consecutive instructions are fetched, until a maximum predetermined amount is reached.

2. A device for fetching instructions from a data store according to claim 1, wherein said adder is configured to increase said predetermined amount by said preset value in response to a signal indicating a bus for retrieving said instructions from said data store is ready.

3. A device for fetching instructions from a data store according to claim 2, said adder comprising a saturating counter configured to increase said predetermined amount by said preset value in response to said signal.

4. A device for fetching instructions from a data store according to claim 1, wherein when said adder adds said maximum predetermined amount to said address stored in said register, said address stored in said register is an address of an instruction currently being executed by said processor.

5. A device for fetching instructions from a data store according to claim 1, wherein said initial value is zero such that said fetch address output by said adder is said address stored in said register.

6. A device for fetching instructions according to claim 1, said device comprising an incrementing device configured to increment said address stored in said register to an address of a next instruction in said program flow, said incrementing device being responsive to detection of an instruction completing execution in said data processor to increment said address stored in said register.

7. A device for fetching instructions according to claim 1, said predetermined amount having a number of different possible values, said number being equal to the cycles taken to fetch, decode and perform a cycle of execution of said instruction.

8. A device for fetching instructions according to claim 1, said device being responsive to detection of an exception to set said predetermined amount to said initial value and to output said address stored in said register incremented by said initial value to a data store.

9. A device for fetching instructions according to claim 8, said device being responsive to a signal indicating resumption of said program, to retrieve an aid instruction address from said data store and to store said instruction address in said register and to set said predetermined amount to said initial value.

10. A device for fetching instructions according to claim 1, said adder comprising a data store configured to store a value indicative of said predetermined amount.

11. A device for fetching instructions according to claim 1, wherein following said predetermined amount reaching said maximum value, said adder is configured to continue to add said maximum value to said address stored in said register until receipt of a signal indicating a change in program flow.

12. A pipelined data processor for processing instructions, comprising:
   (i) a data store configured to store storing instructions;
   (ii) a device according to claim 1 configured to fetch said instructions from said data store;
   (iii) a decoder configured to decode said instructions received from said fetching device;
   (iv) an execute unit configured to execute said decoded instructions.

13. A method of fetching instructions from a data store for processing by a data processor, comprising the steps of:
   (i) generating a fetch address by adding a predetermined amount to an address stored in a register, said predetermined amount determining a position in a program flow an instruction at said fetch address has with respect to an instruction at said address stored in said register, and outputting said fetch address;
   (ii) fetching an instruction from said fetch address, wherein said register stores in a current processing cycle an address of an instruction fetched in a previous processing cycle; and
   in response to detection of a change in program flow:
   (iii) resetting said predetermined amount to an initial value, and performing steps (i) and (ii) for said initial value;
   (iv) increasing said predetermined amount by a preset value and performing steps (i) and (ii) for said increased amount such that a subsequent instruction is fetched and repeating step (iv) up to a maximum predetermined amount.

14. A method according to claim 13, incrementing said address stored in said register to an address of a next instruction in said program flow in response to detection of an instruction completing execution in said data processor, and performing steps (i) and (ii) for said maximum predetermined amount on each incremented address.

15. A method according to claim 13, wherein said maximum predetermined amount is such that when said maximum predetermined amount is added to said address stored in said register, said address stored in said register is an address of an instruction currently being executed by said processor.

16. A method according to claim 13, wherein said initial value is zero.

17. A device for fetching instructions from a data store for processing by a data processor, said device comprising:
- (i) a register configured to store an address of an instruction to be executed by said data processor;
- (ii) a fetch device responsive to a fetch address input to said fetch unit to fetch an instruction stored at said fetch address,
    wherein said register is configured to store in a current processing cycle an address of an instruction fetched by the fetch device in a previous processing cycle;
- (iii) an adder configured to generate said fetch address by adding a predetermined amount to said address stored in said register prior to sending said fetch address to said fetch unit, said predetermined amount determining a position in a program flow said fetched instruction has with respect to an instruction at said address stored in said register and having a value such that when an instruction is being executed said address stored in said register is an address of said instruction being executed wherein said adder is configured to increase said predetermined amount for subsequent fetches by an amount equal to the separation between addresses such that consecutive addresses are fetched up to a maximum predetermined amount;
- (iv) said adder being responsive to detection of a change in program flow to change said predetermined amount to zero such that said fetch address output by said adder is said address stored in said register.

18. A device for fetching instructions according to claim 17, wherein said maximum predetermined amount is such that when said maximum predetermined amount is added to said address stored in said register, said address stored in said register is an address of an instruction currently being executed by said processor.

* * * * *